United States Patent Office 2,933,476
Patented Apr. 19, 1960

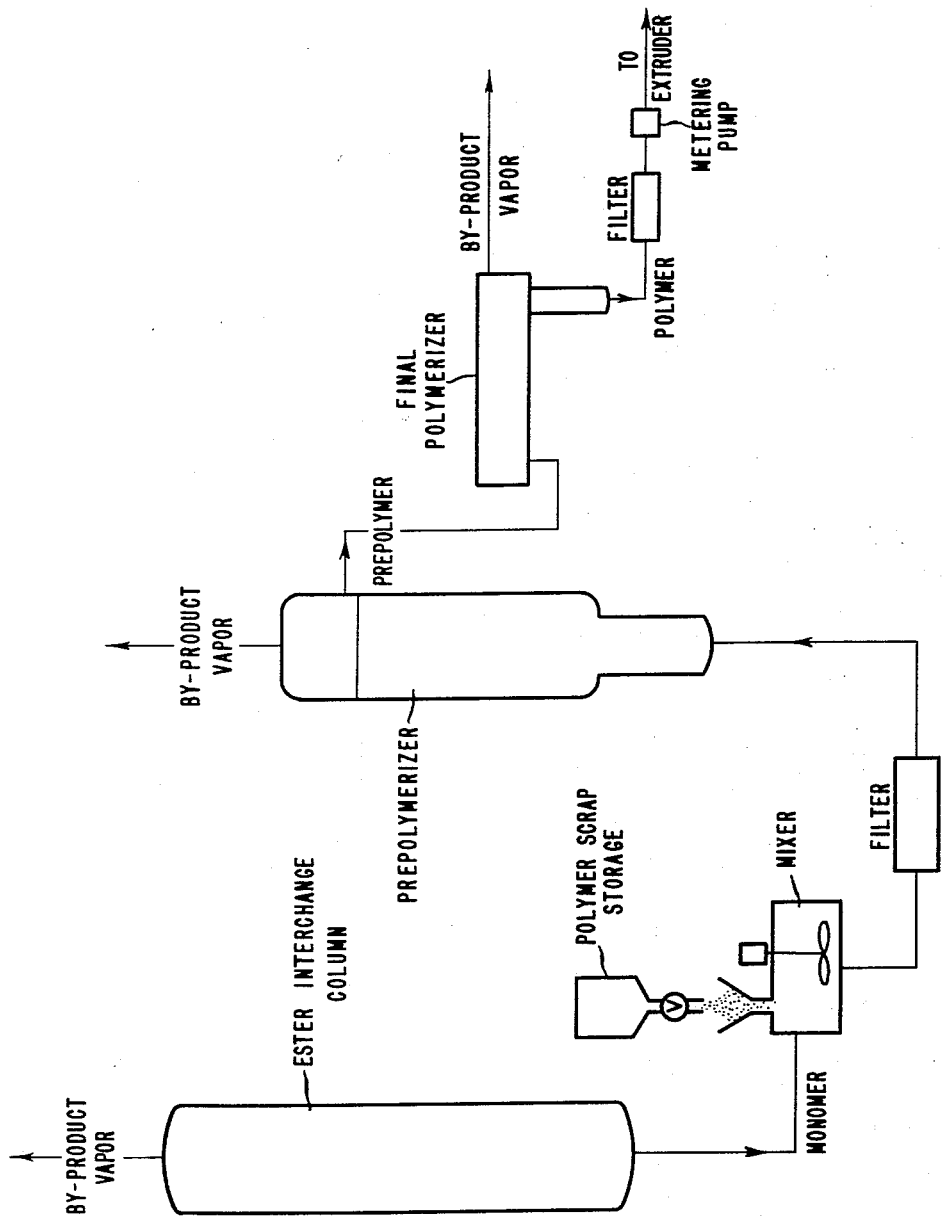

2,933,476

POLYMERIZATION PROCESS

Walter F. Fisher, Circleville, Ohio, assignor to E. I. du Pont de Nemours and Company, Wilmington, Del., a corporation of Delaware Application September 30, 1955, Serial No. 537,652

2 Claims. (Cl. 260—75)

This invention relates to polymerization processes and, more particularly, to improvements in the continuous production of polyethylene terephthalate from dialkyl terephthalate and ethylene glycol.

In the continuous preparation of molten polyethylene terephthalate, ethylene glycol, dimethyl terephthalate, and selected catalysts are continuously fed into an ester exchange column, and monomer, i.e., bis-2-hydroxy ethyl terephthalate; and low molecular weight polymer are continuously withdrawn from the bottom of the column. Thereafter monomer of the above composition is continuously fed into a prepolymerization column which serves to (1) carry out polymerization of the monomer to form low molecular weight polymer and (2) continuously withdraw glycol from the polymerizing liquid. The effluent low molecular weight polyethylene terephthalate is thereafter fed into a "finisher" or final polymerization vessel where further polymerization with evolution of glycol is effected. The effluent polymer, suitable for forming into films or filaments, is withdrawn from the final polymerization vessel by means of a screw pump.

In order to control the polymer quality, provide for an adequate continuous supply of high-quality polymer to the film-casting or filament-spinning operation, prevent entrainment of polymer from the final polymerization vessel, and prevent contamination or fouling of the glycol condensing system of the final polymerization vessel by entrained polymer, it is highly important to control the level of molten polymer in the "finisher" or final polymerization vessel at a height within a certain desirable range. In general, the finisher is arranged to provide, in effect, a series of individual compartments through which the polymerizing mass continuously moves as its viscosity increases. If the liquid level in the final polymerization vessel is permitted to rise to an excessive height, considerable by-passing of low molecular weight polymer directly into compartments containing polymer of appreciably higher molecular weight is likely to occur. Furthermore, high liquid levels in the final polymerization vessel tend to cause foaming which results in appreciable entrainment of liquid polymer into the glycol vapor system. This not only results in a loss of some polymer product but also tends to clog up the vapor-condensing system. High liquid polymer levels in the finisher are also to be avoided for the reason that when excessive liquid is permitted to wash against the upper walls of the final polymerization vessel, degraded polymer particles and particles of gelled polymer, which tend to accumulate on the unwashed wall of the vessel, are washed into the main body of polymer in the vessel. These particles show up as contaminants in the film or filaments subsequently formed. On the other hand, if the liquid level in the final polymerization vessel is permitted to drop below a desired level the flow of effluent polymer to subsequent metering pumps, which meter polymer into the casting or spinning operation, will be insufficient to provide for a uniform flow of material. In this case, the polymer metering pumps are "starved" and the flow of liquid polymer to the casting or spinning operation will tend to come in surges instead of in the form of a uniform feed. Such interruption in flow of polymer to the extrusion operation necessitates eventual shutdown of the extrusion and stretching operations. If the metering pumps, which feed polymer to the casting or spinning operation, are slowed down to prevent starving, the cast film or filament gauge uniformity is adversely affected and eventual shut-down of casting or spinning operations would be necessary.

The polymer level in the final polymerization vessel may, of course, be regulated by increasing or decreasing the continuous feed of ethylene glycol or dimethyl terephthalate or both to the ester exchange column. However, such variations in the feed of these initial reactants tends to disturb the smooth operation of the ester exchange column, particularly, since such changes may have to be made in relatively rapid succession, e.g., several times during a ½ hour operating period. Such frequent variations in feed tend to disturb operation of the ester exchange column, and for this reason, this technique is undesirable.

Liquid polymer level in the final polymerization vessel may also be adjusted to a certain degree by holding back more monomer in the calandria (lower portion) of the ester exchange column. The capacity for effecting any extensive change in the liquid polymer level in the final polymerization vessel by this technique is limited, and here again, the risk of disturbing the operation of the ester exchange column is increased.

The level in the final polymerization vessel may also be adjusted by withdrawing polymer at a greater or lesser rate from the vessel, but this technique is unsatisfactory because the flow of polymer to the extrusion apparatus, which flow must be maintained relatively constant, may be unduly disturbed. Uneven flow of polymer to the extrusion apparatus quite often causes subsequent film or filament breakage during stretching.

A principal object of this invention, therefore, is to provide a convenient and simplified method of controlling the liquid polymer level in the finisher vessel without disturbing the operating conditions in the other vessels of the continuous polymerization operation. A more specific object is to provide a satisfactory method for controlling the liquid polymer level in the finisher vessel in the continuous production of polyethylene terephthalate. These and other objects will more clearly appear hereinafter.

These objects are realized by the present invention which, briefly stated, comprises in the continuous production of polymer wherein primary components are continuously reacted to form a continuous stream of monomer, the monomer is then continuously prepolymerized to form a continuous stream of a relatively low molecular weight polymer with the evolution of vaporous by-products, and the resulting polymer is further continuously polymerized in a final polymerization vessel with the evolution of vaporous by-products to produce a continuous stream of a high molecular weight polymer, the step which comprises dissolving controlled amounts of solid polymer, chemically identical to said high molecular weight polymer, in said stream of monomer prior to said prepolymerization step, the amount of polymer dissolved being regulated to maintain the level of polymer in said final polymerization vessel substantially constant. The invention will be further described with specific reference to the process for the continuous production of polyethylene terephthalate as hereinabove outlined.

The improvement of the present process is not restricted to the use of any particular type of processing apparatus. In general, the process must be tied in with some continuous source of monomer, a polymerization vessel having a capacity for withdrawing considerable quantities of vaporous by-products from the polymerizing monomer to form a "prepolymer," and a vessel for effecting final polymerization of the prepolymer to form a higher molecular weight or more viscous polymer. Controlling the level of liquid polymer in some polymerization vessels is obviously more critical with some types than with others. Control of this liquid level in all types of vessels for carrying out final polymerization, however, is bound to be a relatively critical factor in that it is important to generate the maximum surface area in order to liberate the vaporous by-product rapidly from the polymerizing mass. A suitable ester exchange column wherein glycol is reacted with dimethyl terephthalate in the presence of suitable catalysts is described in detail in U.S. Serial No. 322,693, filed November 26, 1952, in the name of J. L. Vodonik. This apparatus may, of course, be replaced with any suitable continuous source of monomer. A suitable prepolymerization column is described in U.S. Patent 2,727,882 in the name of J. L. Vodonik. This column, by reason of the overlapping arrangement of upcomers, provides for the substantially constant hold-up of the polymerizing mass. A type of final polymerization vessel, useful for purposes of this invention, is described and claimed in copending application, U.S. Patent 2,758,915 in the name of J. L. Vodonik, this apparatus comprising a cylindrical housing for two revolving shafts on which are mounted solid discs and wheels which intermesh to generate polymer surface area.

The Vodonik patent application relating to apparatus for carrying out continuous final polymerization contains some discussion of the necessity of maintaining a particular desirable liquid level during operation. As described in the patent application, the apparatus is designed to provide for individual compartments through which the polymerizing mass continuously moves as its viscosity increases. The solid discs mounted on the double rotors of the Vodonik apparatus serve to divide the cylindrical apparatus into individual compartments. The various types of screens and wheels mounted between these compartment boundaries serve to generate polymer surface area which provides for efficient evolution of the ethylene glycol by-product. In general, the polymer liquid level in finishing apparatus of the type described in the aforementioned patent application should be slightly below the level of the rotor shafts when the shafts are stationary.

Normally, prepolymer having an intrinsic viscosity within the range from about 0.1–0.3 is continuously fed into the final polymerization apparatus, and the intrinsic viscosity of the liquid polymer flowing through the compartments of the vessel increases as it proceeds toward the outlet end of the vessel by virtue of the fact that polymerization is continuing and the vaporous ethylene glycol by-product is continuously being withdrawn. The effluent polymer has an intrinsic viscosity within the range of 0.45–1.2.

The solid polymer is preferably added to the monomer in the form of relatively small particles having their greatest dimension no greater than about 3/16". The outlet from the polymer dissolving tank is covered with a 50-mesh screen to prevent carrying undissolved large particles into the prepolymerization and final polymerization vessels. A convenient source of solid polymer is provided by scrap film resulting, for example, from slitting from film the beaded edges normally formed on the film during the extrusion of the film to facilitate the subsequent transverse stretching of the film. Mill ends of film, rejects, waste yarn and the like may also be used after being reduced to sized particles, above specified.

To effect solution of the polymer flake, the effluent monomer from the ester exchange column is conducted into an agitated vessel to which polymer flake is continuously added, and the polymer is dissolved in monomer with stirring at a temperature within the range of from about 225° to about 240° C., and preferably at about 235° C. By increasing or decreasing the amount of feed of polymer flake to the monomer, the liquid polymer level in the final polymerization vessel may be maintained at a level within desired limits.

For optimum control, it is preferred to add polymer flake (i.e., particles) to monomer at the rate of from 10–30%, by weight, based upon the weight of dimethyl terephthalate fed into the reaction (into the ester exchange column). This is also substantially equivalent to saying that 10–30% of polymer flake is added to the monomer, based upon the weight of ultimate polymer formed in the continuous process. Greater or lesser amounts of polymer flake may be added, and quantities as high as 50% may be introduced into the system.

The following example will further illustrate the principles and practice of this invention. The example is to be read in connection with the accompanying drawing wherein is illustrated diagrammatically a flow-sheet of a continuous polymerization process embodying the improvement of this invention.

*Example*

A continuous ester-exchange reaction column was employed to react continuously ethylene glycol and dimethyl terephthalate. This reaction column produced a continuous supply of a liquid comprising bis-2-hydroxy ethyl terephthalate and a low molecular weight polymer thereof having a degree of polymerization less than 4, on the average. The rate of feed of dimethyl terephthalate to the ester-exchange column was 100 lbs. per hour, and the mol ratio of ethylene glycol/dimethyl terephthalate fed to the column was 2.1/1. The effluent bis-2-hydroxy ethyl terephthalate and low molecular weight polymer thereof were conducted into a vessel provided with adequate agitating means. The temperature of the liquid in this vessel was maintained at about 235° C. A continuous flow of polyethylene terephthalate in flake form was fed to this agitated vessel to form a solution of polymer in monomer. The average feed of polyethylene terephthalate flake to this vessel was 25 pounds per hour.

The resulting solution of polymer in monomer was continuously conducted into the bottom of a continuous prepolymerizer of the type disclosed in U.S. Serial No. 314,695. Ethylene glycol was continuously withdrawn from the top of an entrainment separator mounted on top of the column, the glycol being in vapor form; and the liquid molten polyethylene terephthalate having an intrinsic viscosity between 0.19 and 0.22 was withdrawn from the liquid take-off just below the uppermost plate of the prepolymerization column.

This low molecular weight polymer ("prepolymer") was fed continuously into a final polymerization vessel of the type disclosed in U.S. Serial No. 365,741. Further polymerization of the low molecular weight polymer was carried out continuously as the liquid polymer moved through the polymerization vessel, and the resulting polymer effluent had an intrinsic viscosity of about 0.65. This polymer was in turn pumped to an extrusion die (not shown) where the liquid polymer was extruded in film form and cast upon a quenching surface.

During this operation, the level of liquid polymer at the exit end of the final polymerization vessel was continuously observed. Whenever the liquid level at the exit end of the polymerization vessel tended to rise above or fall below a level considered desirable for the particular operating conditions, the amount of polymer flake feed to the continuous system was either reduced or increased to compensate for variations in this liquid level. In this particular run, the feed of polymer flake of this system varied from 25 pounds per hour to 15 pounds per hour over a period of 19 hours.

The effect of employing the technique of the present invention upon liquid polymer level in the final polymerization vessel is considerably more rapid than can be effected by any other method or means. Furthermore, the present process also has the advantage of simplicity of operation in that it is a relatively simple matter to reduce or increase the amount of solid flake feed to the polymer dissolving vessel.

I claim:

1. In a continuous process for the production of polyethylene terephthalate comprising the steps of continuously feeding a lower dialkyl ester of terephthalic acid and ethylene glycol into an ester-interchange column wherein said ester and glycol are caused to react to form bis-2-hydroxy ethyl terephthalate; continuously passing said bis-2-hydroxy ethyl terephthalate, as it is formed, in a continuous stream to a substantially constant hold-up vessel wherein said bis-2-hydroxy ethyl terephthalate is continuously prepolymerized to form low molecular weight polyethylene terephthalate; continuously passing said polyethylene terephthalate from said vessel in a continuous stream to a final polymerization vessel wherein said polyethylene terephthalate is continuously polymerized to form a higher molecular weight polyethylene terephthalate, and continuously removing said higher molecular weight polyethylene terephthalate in a continuous stream from said final polymerization vessel; the improvement which comprises continuously dissolving in the continuous stream of bis-2-hydroxy ethyl terephthalate, prior to prepolymerizing, solid particles of polyethylene terephthalate, and at a rate constantly regulated in response to variation from a predetermined level of the polymerizing mass in the final polymerization vessel to maintain the level of the polymerizing mass in the final polymerization vessel substantially constant.

2. The process of claim 1 wherein the particles of polyethylene terephthalate are dissolved in bis-2-hydroxy ethyl terephthalate maintained at a temperature of from about 225° C. to about 240° C., and at a rate of from 10%–30%, by weight, based on the weight of the lower dialkyl ester of terephthalic acid fed into the ester interchange column.

References Cited in the file of this patent

UNITED STATES PATENTS

| 2,562,796 | Koch | July 31, 1951 |
| 2,689,839 | Heckert | Sept. 21, 1954 |
| 2,727,882 | Vodonik | Dec. 20, 1955 |
| 2,820,770 | Adams | Jan. 21, 1958 |

FOREIGN PATENTS

| 610,136 | Great Britain | Oct. 12, 1948 |

OTHER REFERENCES

Sears et al.: University Physics, 2nd ed., pp. 216, Addison-Wesley Pub. Co., Inc., Cambridge, Mass. (1955).